United States Patent
Ikeda et al.

(10) Patent No.: US 8,527,511 B2
(45) Date of Patent: Sep. 3, 2013

(54) INFORMATION PROCESSING APPARATUS, INFORMATION PROCESSING METHOD, AND COMPUTER-READABLE MEDIUM FOR SETTING A RETRIEVAL TARGET

(75) Inventors: Hitoshi Ikeda, Ashigarakami-gun (JP); Toshiroh Shimada, Ashigarakami-gun (JP); Naoki Hayashi, Ashigarakami-gun (JP); Tomoyuki Shoya, Ashigarakami-gun (JP); Yoko Kurihara, Ashigarakami-gun (JP); Yasunori Saito, Tokyo (JP); Hajime Ueno, Ashigarakami-gun (JP); Masamichi Takahashi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 650 days.

(21) Appl. No.: 12/498,422

(22) Filed: Jul. 7, 2009

(65) Prior Publication Data

US 2010/0191729 A1    Jul. 29, 2010

(30) Foreign Application Priority Data

Jan. 29, 2009   (JP) .................................. 2009-017765

(51) Int. Cl.
    *G06F 7/00* (2006.01)
(52) U.S. Cl.
    USPC ........................................................ 707/736
(58) Field of Classification Search
    USPC ................. 707/725, 723, 662, 663, 665, 787, 707/736, 746, 999.003
    See application file for complete search history.

(56) References Cited

U.S. PATENT DOCUMENTS

| | | | |
|---|---|---|---|
| 6,434,550 B1 * | 8/2002 | Warner et al. .......................... | 1/1 |
| 7,028,026 B1 * | 4/2006 | Yang et al. ............................. | 1/1 |
| 7,346,839 B2 * | 3/2008 | Acharya et al. ....................... | 1/1 |

FOREIGN PATENT DOCUMENTS

| | | |
|---|---|---|
| JP | 2001-175659 A | 6/2001 |
| JP | 2001-175682 A | 6/2001 |
| JP | 2004-272355 A | 9/2004 |
| JP | 2008-052579 A | 3/2008 |
| JP | 2008-197700 A | 8/2008 |

OTHER PUBLICATIONS

Hatashima et al., "An Analysis of the Access Logs Regarding its time sequential data", 1997 (translated Aug. 2011), Information Processing Society of Japan 54th National Convention, vol. 4, pp. 1-13.*
Japanese Office Action issued on Nov. 24, 2010 in the corresponding Japanese Patent Application No. 2009-017765.

(Continued)

*Primary Examiner* — Rehana Perveen
*Assistant Examiner* — Hung Havan
(74) *Attorney, Agent, or Firm* — Sughrue Mion, PLLC (57) ABSTRACT

An information processing apparatus includes a calculation unit, an information selection unit and an information retrieval unit. The calculation unit calculates a retrieval target level for each information based on time from when the information was stored in the past to the present. The retrieval target level for each information is used to determine as to whether or not each information is set as a retrieval target. The information selection unit selects some of the pieces of information as the retrieval targets based on the retrieval target levels calculated by the calculation unit. The information retrieval unit retrieves the some of the information selected by the information selection unit.

11 Claims, 10 Drawing Sheets

(56) References Cited

OTHER PUBLICATIONS

Hatashima, T. et., al. "A Study on "Kanshindo" rating the amount of interest for WWW server", The Institute of Electronics, Information and Communication Engineers, Technical Report of IEICE, Aug. 5, 1999, vol. 99, No. 253, pp. 49-57, Abstract.

Japanese Office Action issued Mar. 4, 2011, in Application No. 2009-017765.

Takashi Hatajima, "Access Log Analysis considering Time Series Information, Information Processing"; Information Processing Society of Japan; Sep. 15, 1997; vol. 38, No. 9; pp. 848-849, Abstract.

Rajeev Motwani, et al.; "Query Processing, Resource Management, and Approximation in a Data Stream Management System", Proceedings of the 2003 CIDR Conference; Stanford University USA; 12 pages.

* cited by examiner

INFORMATION PROCESSING APPARATUS, INFORMATION PROCESSING METHOD, AND COMPUTER-READABLE MEDIUM FOR SETTING A RETRIEVAL TARGET

CROSS-REFERENCE TO RELATED APPLICATIONS

This application is based on and claims priority under 35 USC 119 from Japanese Patent Application No. 2009-17765 filed on Jan. 29, 2009.

BACKGROUND

1. Technical Field

The present invention relates to an information processing apparatus, an information processing method, a computer-readable medium storing a program that causes a computer to execute image processing and a computer data signal embedded with the program.

2. Related Art

Information processing apparatuses have been widely used to support sharing, storing and using information. When a user stores prepared or acquired information in an information processing apparatus and reuses the information, the user narrows the range of prospective information for reuse from the information stored in the information processing apparatus by using a key word (for example, bibliography information) contained in the information as a retrieval key. In recent years, with the realization of high capacity and low cost storage, the amount of information that can be stored in an information processing apparatus has rapidly increased in quantity.

SUMMARY

According to an aspect of the invention, an information processing apparatus includes a calculation unit, an information selection unit and an information retrieval unit. The calculation unit calculates a retrieval target level for each information based on time from when the information was stored in the apparatus in the past to the present. The retrieval target level for each information is used to determine as to whether or not each information is set as a retrieval target. The information selection unit selects some of the pieces of information as the retrieval targets based on the retrieval target levels calculated by the calculation unit. The information retrieval unit retrieves the some of the information selected by the information selection unit.

BRIEF DESCRIPTION OF THE DRAWINGS

Exemplary embodiment of the invention will be described in detail below with reference to the accompanying drawings, wherein.

DETAILED DESCRIPTION

Hereinafter, various exemplary embodiments suitable for the implementation of the present invention will be described with reference to the drawings.

Figure 1:
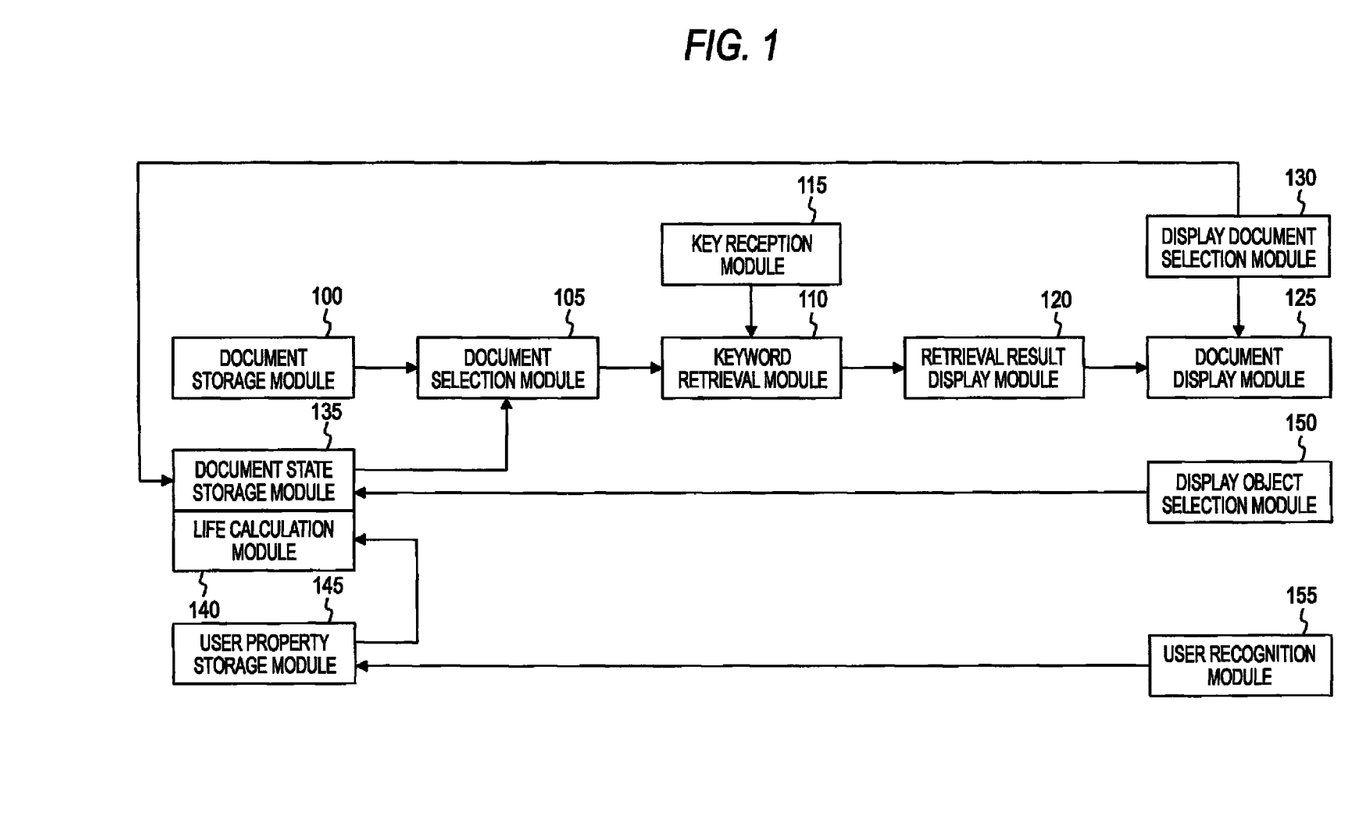
FIG. 1 is a conceptual view showing an example of the module configuration according to a first exemplary embodiment.

FIG. 1 is a conceptual view showing an example of the module configuration according to a first exemplary embodiment.

A module used herein refers generally to a part such as logically separable software (computer program), hardware and so on. Accordingly, a module in this embodiment includes not only a module in a computer program but also a module in a hardware configuration. Thus, this embodiment addresses the computer program, system and method in combination. For the purpose of convenience of description, as used herein, "store," "be stored" or its equivalent means that a computer program is stored in a storage device or is controlled to be stored in a storage device. Although each single module substantially corresponds to one function, for mounting on the embodiment, one module may be configured as one program, plural modules may be configured as one program, or one module may be configured as plural programs. Plural modules may be executed by one computer, or one module may be executed by Plural computers in distributed or parallel environments. One module may contain other modules. As used herein, the term "connection" includes logical connection (data delivery, instruction, reference relation between data, etc) in addition to physical connection.

As used herein, the term "system" or "apparatus" can apply to a single computer, piece of hardware, apparatus and the like in addition to plural computers, hardware, apparatuses and the like interconnected via a communication means such as a network (including one-to-one correspondence communication connection). In the specification, "apparatus" is synonymous with "system." As used herein, the term "predetermined" is meant to include not only determination before the start of processing by the embodiments but also determination according to situations and conditions at that time or situations and conditions up to that time even after the start of processing by the embodiments.

In the following description, the term "retrieval target level" refers to a numerical value that is used to determine as to whether or not information is set as a retrieval target. For example, a retrieval target level for certain information and a predetermined threshold value are compared, and then it is determined based on a magnitude relationship therebetween as to whether or not the certain information is set as a retrieval target. In the following description, the exemplary embodiments will be described with a life value which decreases with time (it decreases when no selection is made to a document or an object within the document, but may increase if any selection is made thereto) being used as an example of the retrieval target level. Accordingly, if a life value of certain information is smaller than the predetermined threshold value, the information does not become a retrieval target.

In the following description, the exemplary embodiment will be described with a document being used as an example of the information. The term "document" includes electronic data such as images, moving pictures and audio, or a combination thereof, as well as data and its equivalents capable of becoming a target to be stored, edited or retrieved and capable of being exchanged in individual units between systems or users. A document contains one or more objects. An "object within a document" refers to data constituting the document, including, for example, character string data (including one or more characters), figure data, image data, etc.

The information processing apparatus of the first exemplary embodiment retrieves documents after narrowing down documents to be retrieved, and includes a document storage module 100, a document selection module 105, a keyword retrieval module 110, a keyword reception module 115, a retrieval result display module 120, a document display module 125, a display document selection module 130, a document state storage module 135, a life calculation module 140, a user property storage module 145, a display object selection module 150 and a user recognition module 155, as shown in FIG. 1.

The document storage module 100 is connected to the document selection module 105. The document memory module 100 stores documents to be retrieved. The documents may be stored in advance, or created documents may be stored as needed. The stored documents are accessed and retrieved by the document selection module 105.

The document selection module 105 is connected to the document storage module 100, the keyword retrieval module 110 and the document state storage module 135. The document selection module 105 selects a retrieval target document(s) (a document to be retrieved) from the documents stored in the document storage module 100, based on life values of the stored document which are calculated by the life calculation module 140. Calculating of the life values by the life calculation module 140 will be described in detail later. Then, the document selection module 105 transfers the selected document(s) to the keyword retrieval module 110.

The document selection module 105 may select, as a retrieval target, either a document(s) or an object(s) which are past selected parts of in the documents based on a predetermined second threshold value. For example, the document selection module 105 compares a life value of a certain document with the second threshold value. If the life value of the certain document is larger than the second threshold value, the document selection module 105 selects the certain document as a retrieval target. If the life value of the certain document is smaller than the second threshold value, the document selection module 105 selects an object which is a past selected part in the certain document as a retrieval target. In this manner, the retrieval target is changed with the second threshold value being used as a boundary. That is, if the life value of the certain document is smaller than the second threshold value, only the past selected object of the certain document, rather than the entire certain document, is set as the retrieval target.

The document selection module 105 may select a document(s) as a retrieval target(s) based on a predetermined third threshold value. For example, the document selection module 105 compares a life value of a certain document with the third threshold value. If the life value of the certain document is larger than the third threshold value, the document selection module 105 selects the certain document or the object, which is the past selected part of the certain document, as a retrieval target. If the life value of the certain document is smaller than the third threshold value, the document selection module 105 does not set the certain document (including the past selected object) as a retrieval target. In this manner, a retrieval target is selected with the third threshold value being used as a boundary. A relation between the second threshold value and the third threshold value is set in advance so that the second threshold value is larger than the third threshold value.

The keyword reception module 115 is connected to the keyword retrieval module 110. The keyword reception module 115 receives a keyword for retrieval. The keyword is transferred to the keyword retrieval module 110. The keyword reception module 115 may receive a keyword in response to user's operation of a keyboard, a mouse or the like or may read out a keyword stored in a storage device (including one connected via a network in addition to one contained in the information processing apparatus) or the like.

The keyword retrieval module 110 is connected to the document selection module 105, the keyword reception module 115 and the retrieval result display module 120. The keyword retrieval module 110 retrieves the document(s) and/or the object(s), which are selected by the document selection module 105, with the keyword transferred from the keyword reception module 115. The result of the retrieval (including a document ID identifying a document containing the keyword, a position of the keyword in the document, and the like) is transferred to the retrieval result display module 120. This retrieval may be a full text retrieval or a retrieval using an inverted file or the like.

The retrieval result display module 120 is connected to the keyword retrieval module 110 and the document display module 125. The retrieval result display module 120 receives the retrieval result from the keyword retrieval module 110 and displays the retrieval result in a list form on a display provided in the information processing apparatus, for example. Then, a process is performed by the document display module 125.

The document display module 125 is connected to the retrieval result display module 120 and the display document selection module 130. The document display module 125 displays one document in the retrieval result on the display based on an instruction received from the display document selection module 130 after the retrieval result is displayed by the retrieval result display module 120. The document to be displayed is read from the document storage module 100.

The display document selection module 130 is connected to the document display module 125 and the document state storage module 135. The display document selection module 130 selects a document from the retrieval result displayed by the retrieval result display module 120 in response to user's operation of a keyboard, a mouse or the like. The display document selection module 130 transmits an instruction to display the document to the document display module 125 and transfers the result of the selection (including a document ID identifying the selected document, a user ID identifying the user performing the selection of the document, selection time, and the like) to the document state storage module 135.

The document state storage module 135 is connected to the document selection module 105, the display document selection module 130, the display object selection module 150 and the life calculation module 140. The document state storage module 135 receives and stores the document ID identifying the selected document, time at which the selection was made, the user ID identifying a user who selected the document, and the like from the display document selection module 130. In addition, the document state storage module 135 receives and stores an object ID identifying an object in the selected document, time at which the selection was made, a user ID identifying a user who selected the object, a document ID identifying a document containing the object, an edit type that was performed for the object, and the like from the display object selection module 150. In addition, the document state storage module 135 is accessed by the life calculation module 140, transfers what are stored therein to the life calculation module 140, and stores a life value(s) calculated by the life calculation module 140. In addition, the document state storage module 135 is accessed by the document selection module 105, and transfers the stored life value(s) to the document selection module 105.

Figure 4:
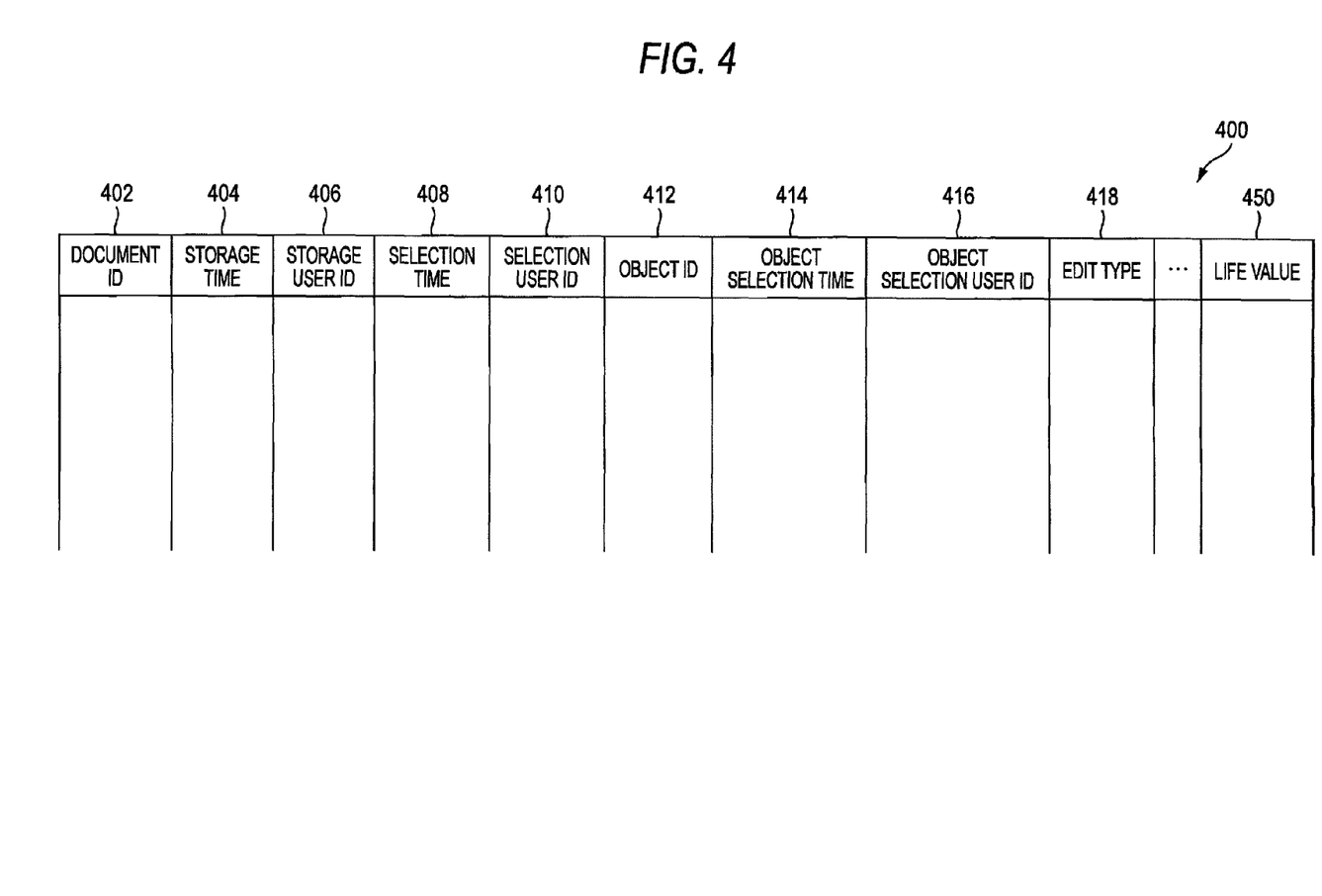
FIG. 4 is an explanatory view showing an example data structure of a document state table.

For example, the document state storage module 135 stores a document state table 400. FIG. 4 is an explanatory view showing an example data structure of the document state table 400.

The document state table 400 has a document ID column 402, a storage time column 404, a storage user ID column 406, a selection time column 408, a selection user ID column 410, an object ID column 412, an object selection time column 414, an object selection user ID column 416, an edit type column 418, a life value column 450 and so on, and stores states of the documents (access histories of the documents) stored in the document storage module 100.

The document ID column 402 stores a document ID (IDentifier) as an identifier which can identify a document uniquely.

The storage time column 404 stores time at which the document was stored in the document storage module 100 (the time may include year, minute and second as well as date, and this also applied to other "time" described later) The storage time column 404 may store time at which the document was created.

The storage user ID column 406 stores a user ID identifying a user who stored the document. The user ID is a user ID of a user who is recognized by the user recognition module 155. In addition, the user ID may be the user ID of the user who created the document.

The selection time column 408 stores time at which the document was selected by the display document display module 130.

The selection user ID column 410 stores a user ID identifying a user who selected the document.

The object ID column 412 stores an object ID as an identifier which can uniquely identify an object being in the document and being selected by the display object selection module 150.

The object selection time column 414 stores time at which the object was selected by the display object selection module 150.

The object selection user ID column 416 stores a user ID identifying a user who selected the object.

The edit type column 418 stores an edit type for the object (for example, copy, enlargement, reduction and so on). For example, if the object is selected and edited by a user, its edit type is stored.

In addition, since there may be a case where plural objects are selected from one document, plural object ID columns 412, plural object selection time columns 414, plural object selection user ID columns 416 and plural edit type columns 418 may be provided for one document ID.

The life value column 450 stores a life value calculated by the life calculation module 140.

The life calculation module 140 is connected to the user property storage module 145 and the document state storage module 135. The life calculation module 140 calculates a life value of a document for determining as to whether or not the document is set as a retrieval target, based on the time from when the document was selected in the past. The time from when the document was selected in the past is obtained by calculating a period of time from the document selection time stored in the document state storage module 135 to the current time. In addition, the life calculation module 140 stores the calculated life value in the document state storage module 135 in association with the document.

In addition, the life calculation module 140 may calculate a life value based on the time from when an object which is a part of the document was selected in the past. The time from when the object in the document was selected in the past is obtained by calculating a period of time from the object selection time stored in the document state storage module 135 to the current time.

In addition, the life calculation module 140 may calculate a life value of a document or an object according to a property (properties) of a user(s) who selected the document or the object in the document. In this case, the life calculation module 140 receives the user property (user properties) from the user property storage module 145. A "user property" may refer to a numerical value obtained by quantifying to what extent one user have an influence on other users, for example, a numerical value corresponding to a user's position (status) (for example, a higher ranking position has a larger numerical value), a numerical value corresponding to the number of created documents, a numerical value corresponding to the number of times a document is referenced (for example, the number of times a document is referenced by other documents), etc. For example, the life calculation module 140 transfers the user ID(s) stored in the document state storage module 135 to the user property storage module 145 and acquires a user property value(s) corresponding to the user ID(s) from the user property storage module 145.

In addition, the life calculation module 140 may calculate the life value based on a predetermined first threshold value using one of a first function and a second function being different from the first function. That is, the function to calculate the life value is changed with the first threshold value being used as a boundary. The function to be applied is changed according to a magnitude relation between the life value and the first threshold value. For example, if the life value is larger than the first threshold value, the life value is calculated using the first function. If the life value is smaller than the first threshold value, the life value is calculated using the second function. In addition, the relation between the first threshold value and a second threshold value is set in advance so that the first threshold value is larger than the second threshold value. Accordingly, the first threshold value, the second threshold value and a third threshold value have a relation which decreases in order.

The user recognition module 155 is connected to the user property storage module 145. The user recognition module 155 recognizes a user who is using the information processing apparatus. For example, when the user uses the information processing apparatus, the user recognition module 155 may receive and authenticate a user ID and a password. In addition, the user recognition module 155 may read an IC (Integrated Circuit) card possessed by the user to recognize the user. The user recognition module 155 transfers the recognized user ID to the user property storage module 145.

The user property storage module 145 is connected to the life calculation module 140 and the user recognition module 155. The user property storage module 145 receives the user ID from the user recognition module 155 or the life calculation module 140 and transfers a user property value corresponding to the user ID to the life calculation module 140. For example, the user property value corresponding to the user ID is set in advance.

Figure 6:
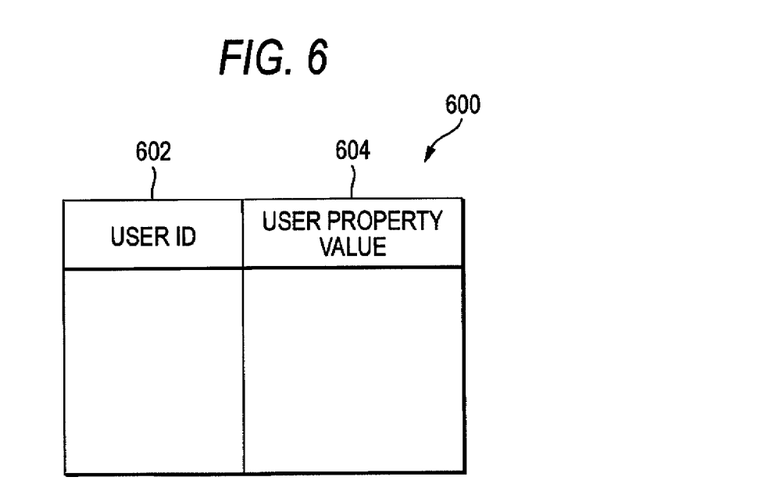
FIG. 6 is an explanatory view showing an example data structure of a user property table.

For example, the user property storage module 145 stores a user property table 600. FIG. 6 is an explanatory view showing an example data structure of the user property table 600.

The user property table 600 has a user ID column 602 and a user property value column 604.

The user ID column 602 stores a user ID.

The user property value column 604 stores a property value of a user identified by the user ID.

The user property storage module 145 receives the user ID from the user recognition module 155 or the life calculation module 140, retrieves the corresponding user ID from the user ID column 602, extracts a user property value corresponding to the retrieved user ID from the user property value column 604, and transfers the extracted user property value to the life calculation module 140.

The display object selection module 150 is connected to the document state storage module 135. The display object selection module 150 selects an object in the document displayed by the document display module 125 according to user's operation of a keyboard, a mouse or the like. The display object selection module 150 transfers the result of the selection (a document ID identifying the selected document, an object ID identifying the selected object, a user ID identifying the user performing the selection of the object, the selection time, and the like) to the document state storage module 135. The number of objects to be selected may be one or more, or all of the objects contained in the document may be selected.

Figure 2:
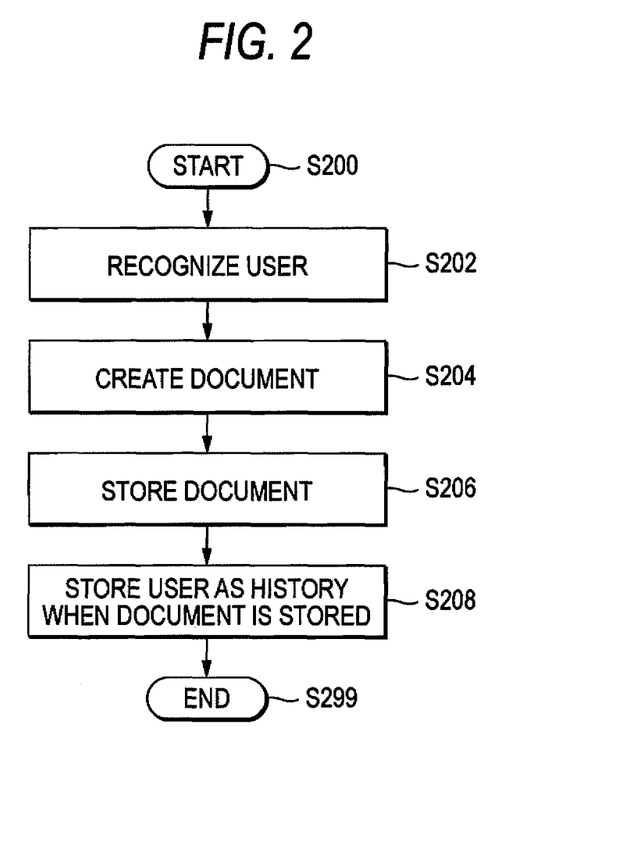
FIG. 2 is a flow chart showing an example process of document creation according to the first exemplary embodiment.

FIG. 2 is a flow chart showing an example process of document creation according to the first exemplary embodiment.

At Step S202, the user recognition module 155 recognizes a user who attempts to create a document.

At Step S204, the information processing apparatus creates a document in response to user's operation.

At Step S206, the created document is stored in the document storage module 100.

At Step S208, the information processing apparatus generates a document ID as an identifier which can identify the created document uniquely, and stores the document ID, storage time (time at which the document is stored), and a user ID identifying the user who stores the document in the respective columns of the document state table 400.

Figure 3:
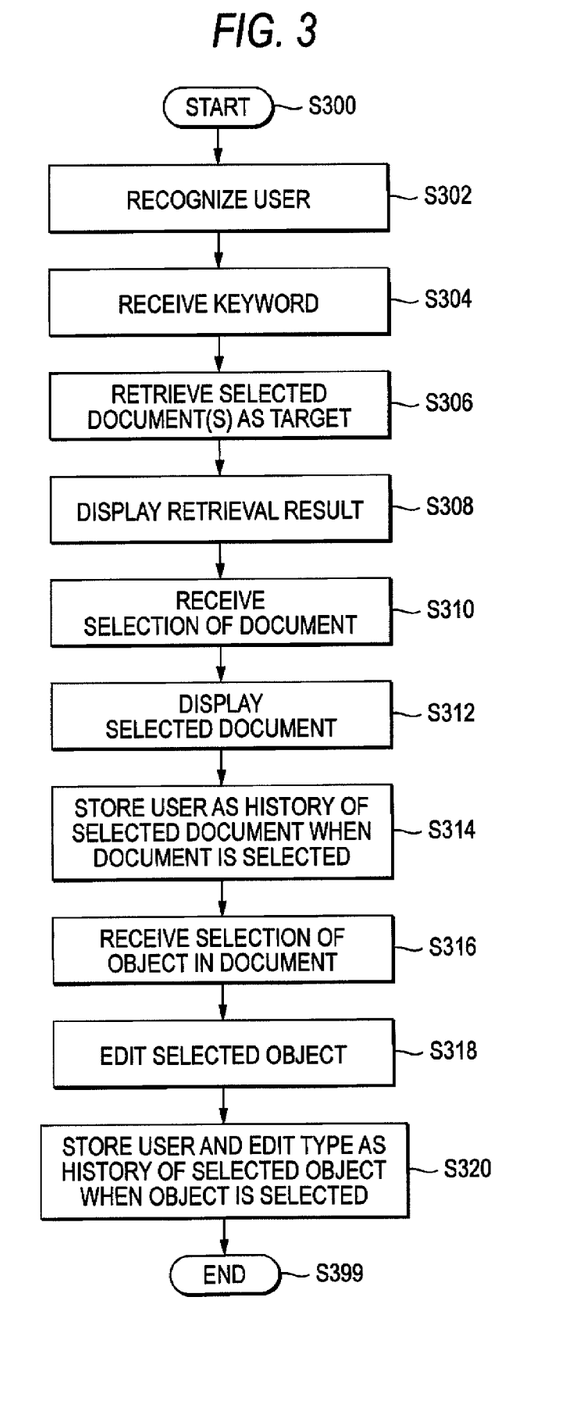
FIG. 3 is a flow chart showing an example process of document retrieval according to the first exemplary embodiment.

FIG. 3 is a flow chart showing an example process of document retrieval according to the first exemplary embodiment.

At Step S302, the user recognition module 155 recognizes a user who attempts to retrieve a document.

At Step S304, the keyword reception module 115 receives a keyword in response to user's operation.

At Step S306, the keyword retrieval module 110 retrieves a document selected by the document selection module 105. The document selection process by the document selection module 105 and the like will be described later with reference to FIG. 5.

At Step S308, the retrieval result display module 120 displays the retrieval result.

At Step S310, the display document selection module 130 selects a document from the retrieval result based on user's operation.

At Step S312, the document display module 125 displays the selected document.

At Step S314, the document state storage module 135 stores document selection time (time at which the document is selected), a user ID identifying the user who selects the document, etc. in the selection time column 408, the selection user ID column 410, etc.

At Step S316, the display object selection module 150 selects an object in the displayed document based on user's operation.

At Step S318, the display object selection module 150 edits the selected object based on user's operation.

At Step S320, the document state storage module 135 stores an object ID of the selected object, the object selection time (time at which the object is selected), a user ID identifying the user who selects the object, an edit type of the selected object, etc. in the object ID column 412, the object selection time column 414, the object selection user ID column 416, the edit type column 418, etc.

Figure 5:
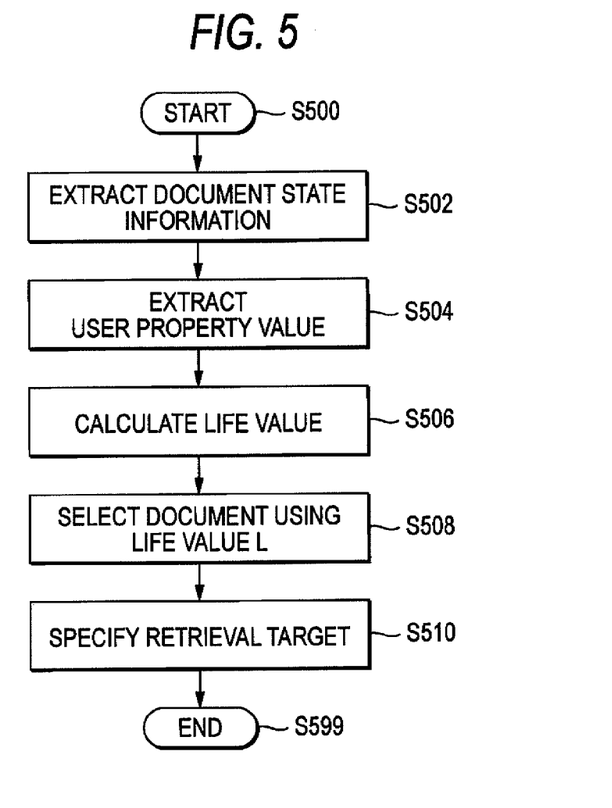
FIG. 5 is a flow chart showing an example process of document selection according to the first exemplary embodiment.

FIG. 5 is a flow chart showing an example process of document selection according to the first exemplary embodiment. This figure shows an example process of selecting a document in order to perform the retrieval process at Step S306 in the flow chart shown in the example of FIG. 3.

At Step S502, the life calculation module 140 extracts a document state from the document state storage module 135 based on an instruction from the document selection module 105.

At Step S504, the life calculation module 140 extracts a user property value from the user property storage module 145.

At Step S506, the life calculation module 140 calculates a life value of each document.

An example of the life value calculation is as follows.

It is assumed that $Ld \geq Th1$, that a selection operation is performed by the display document selection module 130 or the display object selection module 150, and that the number of users who make unique access (selection) is k, $$Ld = E(Dd) + \sum_{j=1}^{k} E1(Dj) \quad (1)$$

$$E(Dd) = \exp(-Dd \times C1) \quad (2)$$

$$E1(DAd) = CA \times \exp(-DAd \times C1) \quad (3)$$

where, Ld represents the life value of a document d, Th1 represents the predetermined first threshold value, Dd represents a period of time elapsed after the document d was stored in the document storage module 100, C1 represents a predetermined value, CA represents a user property value of a user A, and DAd represents a period of time elapsed after the user A accessed the document d.

That is, the life value Ld of the document d is a value determined by a decreasing function, for example, an exponential function, based on the period of time Dd elapsed after the document d was stored in the document storage module 100, the period of time Did elapsed after the document d was selected by a user i, a user property value Ci of the user i who selected the document d, and the number of users k who selected the document d. If the life value Ld is equal to or larger than Th1, the life value Ld may be determined by a function which decreases with time and increases with selection.

After Ld becomes less than Th1 (Ld<Th1) once, Ld decreases by a predetermined value C2 every predetermined period of time (see Equation 4 below). That is, if the life value is smaller than Th1, the life value is calculated by a function different from the function, which is used when the life value is equal to or larger than the Th1.

$$Ld = Ld - C2 \quad (4)$$

When the document d is selected by the display object selection module 150, Ld is increased (see Equation 5 below).

$$Ld = \min(Ld + C3 \times Cx, Th1) \quad (5)$$

where, Cx represents a user property value of the user who selects the object and C3 represents a predetermined value.

That is, if Ld<Th1, when a selection is made between the time when the life value Ld becomes equal to Th1 and the current time, the life value Ld is determined by a decreasing function, for example, a monotone decreasing function, based on a user property value of the user who made the selection.

Figure 8:
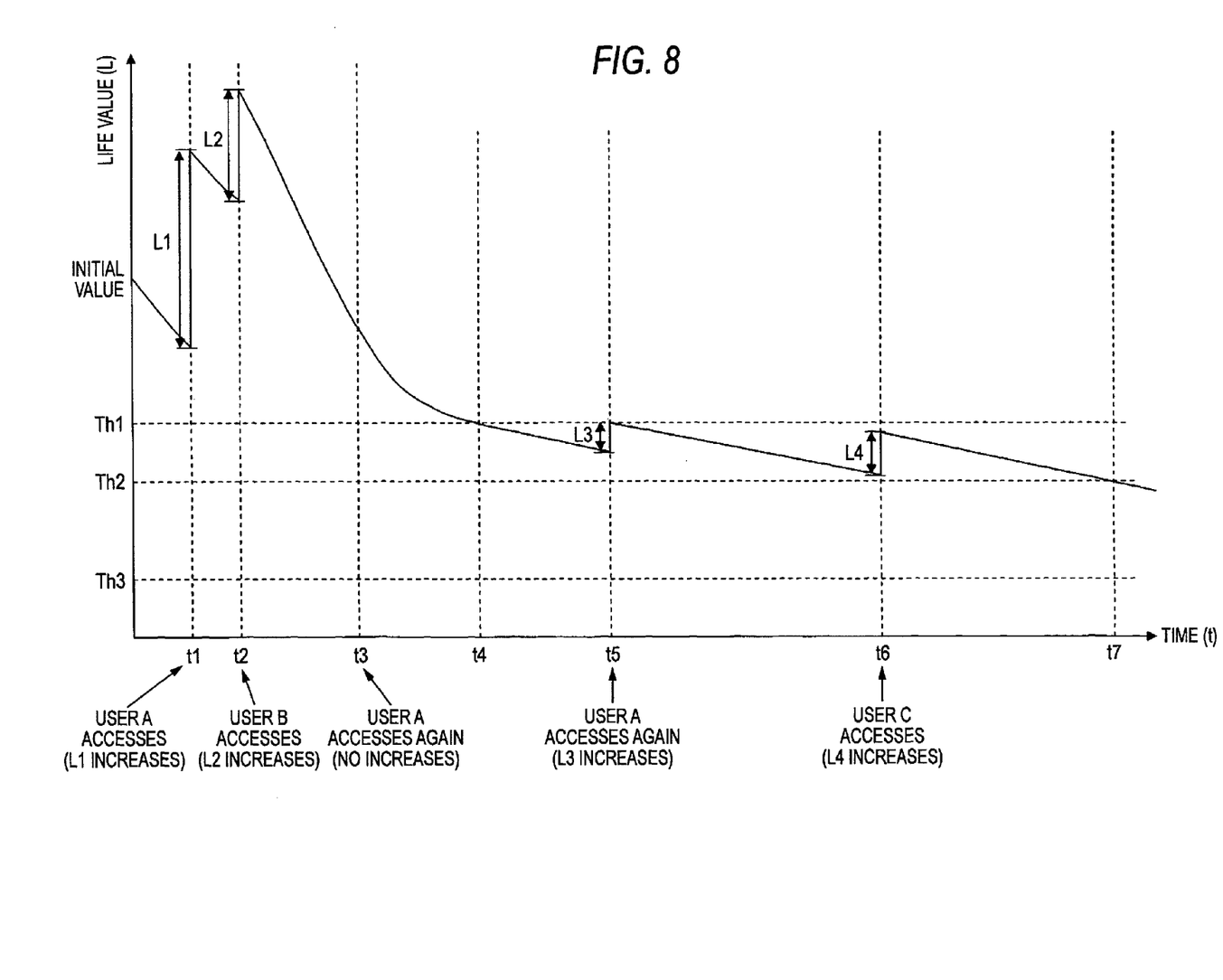
FIG. 8 is an explanatory view showing an example of variation of a life value according to the first exemplary embodiment.

The calculation of the life value will be described with an example shown in FIG. 8. FIG. 8 is an explanatory view showing an example of the variation of a life value according to the first exemplary embodiment.

In this figure, a horizontal axis represents time (t), and a vertical axis represents a life value L. In a state where t=0, that is, when a certain document is just stored in the document storage module 100, the life value L has an initial value. The life value L decreases with time. The life value L is increased by L1 because of a property value of a user A when the user A selects the certain document (at t1). Then, the life value L is again decreased with time. Next, when a user B selects the certain document (at t2), the life value L is increased by L2 because of a property value of the user B. In the figure, the reason why L1 is larger than L2 is that the property value of the user A increases the life value L more than the property value of the user B. Thereafter, the life value L is decreased with time.

The user selects the certain document (at t3). However, the user A has already selected the certain document at t1. If the same user selects the certain document again, the life value L is only increased at the first selection by the same user. The life value L is not increased for second and later selections if L≧Th1. The life value L keeps being decreased with time.

After Ld<Th1 (after t4), the life value L is decreased with a decreasing function different from the function, which is used when L≧Th1.

When the user A again selects an object in the certain document (at t5), the life value L is increased by L3. As can be seen from the above Equation 5, after once Ld is less than Th1 (Ld<Th1), there is no case where Ld exceeds Th1. Thereafter, the life value L is decreased. When a user C selects an object in the certain document (at t6), the life value L is increased by L4. Thereafter, the life value is decreased in a similar way.

The case of Ld≧Th1 is different from the case of Ld<Th1 in the followings. That is, (1) the decreasing function sharply decreases initially, (2) the life value L is not increased by repeated access of the same user, (3) the life value L is increased by both selection of a document and selection of an object in the document, while in the case of Ld<Th1, the life value L is only increased by selecting the object of the document, and (4) the life value L may be increased to exceed the initial value when the document is selected, while the life value L is not increased to be larger than Th1 in the case of Ld<Th1. The first exemplary embodiment may be modified so that any one of the above items (1) to (4) is met. For example, even in the case of Ld<Th1, the life value L may be increased by both selection of a document and selection of an object in the document.

Accordingly, because of the change in the life value L as described, the document use of the unique users increases the life value L in the initial period where the document is stored. For example, as a document has a greater influence to the surroundings, that is, is used for a longer period of time by more users, the life value will last for a longer period of time. To the contrary, the life value of a document used only briefly will last for a shorter period of time. When the use of the document is converged to some extent (the case of Ld<Th1), the life value is increased with usage frequency of the document. That is, the more popular the document is, the longer the life time period will last.

In addition, the life value of the document is increased more when the document is used by a user who has a larger user property value. In the case of a company, it is assumed that a higher rank user has a greater influence to the surroundings. Therefore, by setting a larger user property value (a value increasing a life value) for the higher rank user, it is possible to greatly increase the life value of a document considered to have great influence to the surroundings. In addition, a user property value may be updated based on a document state (access history) stored in the document state storage module 135, such that the user property value of a user who creates a document having a large life value that lasts for a longer period of time (for example, the case where the period of time for which a life value exceeding a predetermined value lasts is longer than a predetermined period of time), that is, the user property value of a user who creates a document having a greater influence to the surroundings becomes large.

At Step S508, the document selection module 105 selects the document using the life value L. A process in Step S508 will be described below using a flow chart shown in an example of FIG. 7.

Figure 7:
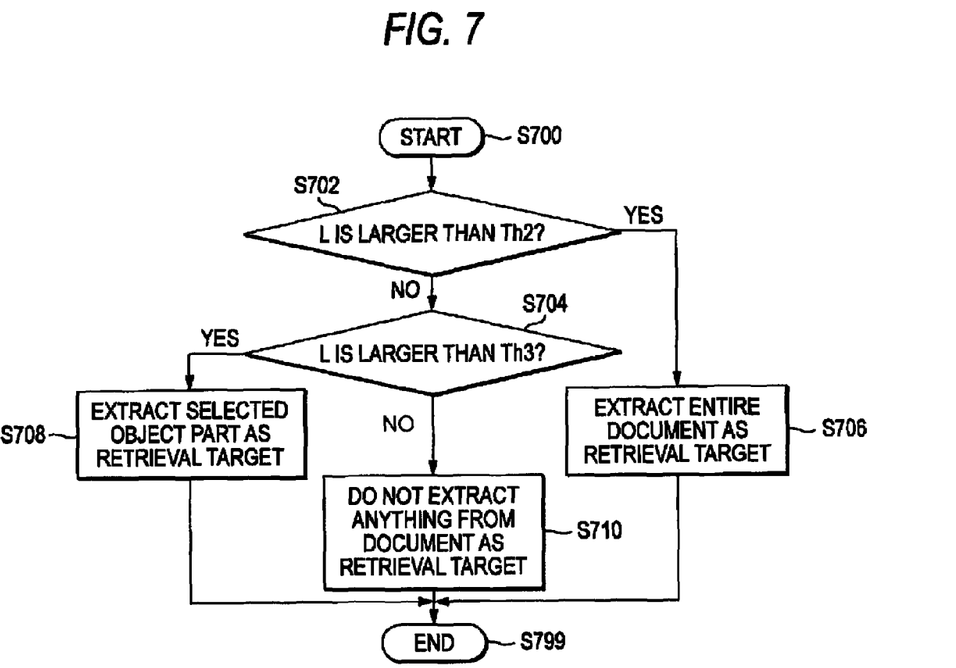
FIG. 7 is a flow chart showing an example process of document extraction or the like according to the first exemplary embodiment.

FIG. 7 is a flow chart showing an example process of document extraction or the like according to the first exemplary embodiment. This process is performed for each document stored in the document storage module 100.

At Step S702, the document selection module 105 determines as to whether or not the life value L of a document being processed exceeds the second threshold value Th2. If it is determined that the life value L exceeds Th2 (Y in Step S702), the process proceeds to Step S706. Otherwise (N in Step S702), the process proceeds to Step S704.

At Step S704, the document selection module 105 determines as to whether or not the life value L of the document being processed exceeds the third threshold value Th3. If it is determined that the life value L exceeds Th3 (Y in Step S704), the process proceeds to Step S708. Otherwise (N in Step S704), the process proceeds to Step S710.

At Step S706, the document selection module 105 extracts the entire text of the document, as a retrieval target, from the document storage module 100. This corresponds to the case where the retrieval is performed in a state prior to t7 shown in the example of FIG. 8.

At Step S708, the document selection module 105 extracts text in a selected object of the document, as a retrieval target, from the document storage module 100. This corresponds to the case where the retrieval is performed in a state where the life value L is larger than Th3 after t7 in the example of FIG. 8.

At Step S710, the document selection module 105 does not extract a retrieval target from the document. This corresponds to the case where the retrieval is performed in a state where the life value L is smaller than Th3 after t7 in the example of FIG. 8.

At Step S510, the document selection module 105 performs a process of specifying the selected document as a retrieval target. That is, when a document is selected, the text contained in the document a retrieval target. When an object in the document is selected, the text contained in the object is set a retrieval target. Thereafter, the keyword retrieval module 110 searches the specified retrieval target for the keyword.

Figure 9:
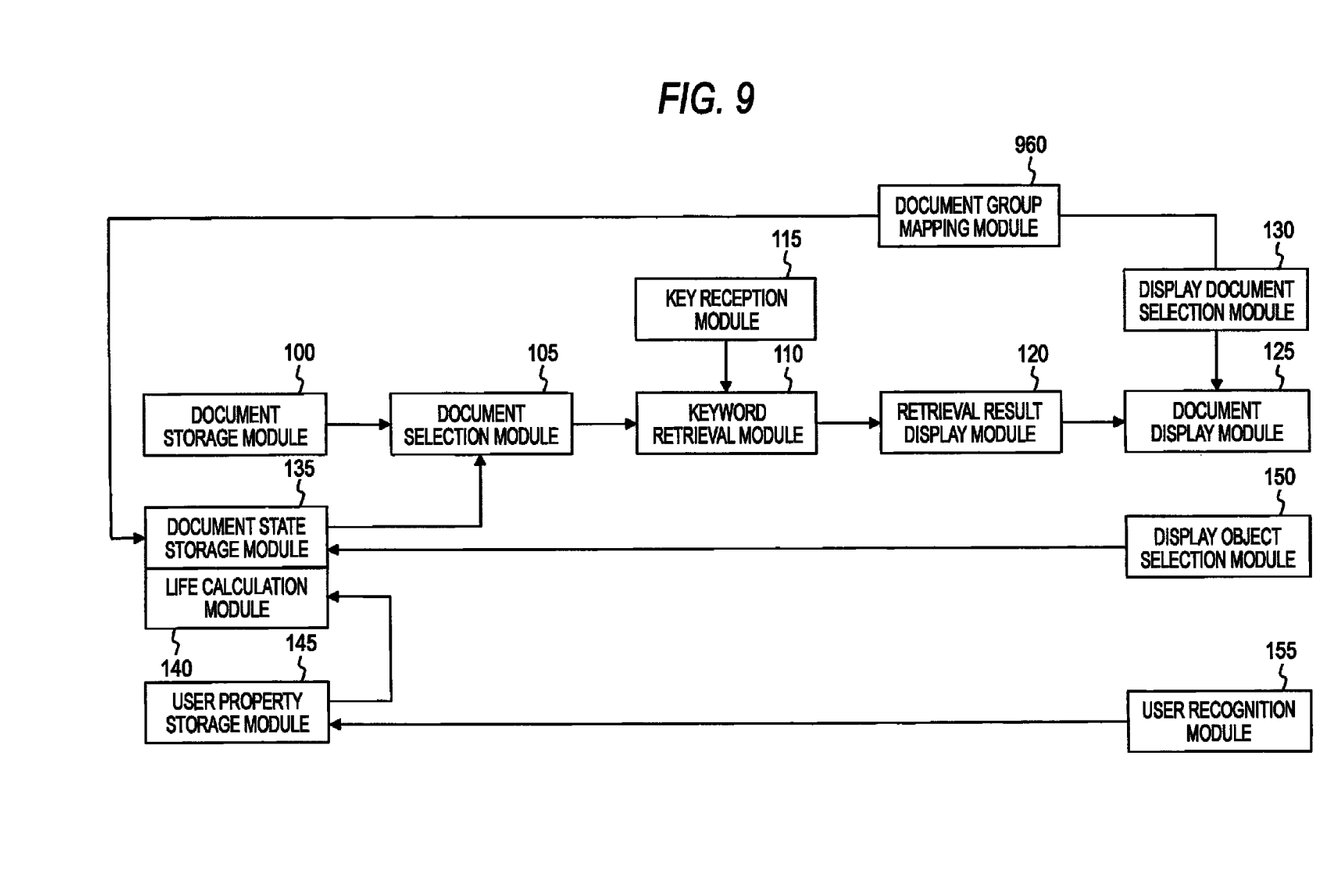
FIG. 9 is a conceptual view showing an example of the module configuration according to a second exemplary embodiment.

FIG. 9 is a conceptual view showing an example of module configuration according to a second exemplary embodiment. An information processing apparatus of the second exemplary embodiment includes a document storage module 100, a document selection module 105, a keyword retrieval module 110, a keyword reception module 115, a retrieval result display module 120, a document display module 125, a display document selection module 130, a document state storage module 135, a life calculation module 140, a user property storage module 145, a display object selection module 150, a user recognition module 155 and a document group mapping module 960. In the second exemplary embodiment, the same elements as the first exemplary embodiment are denoted by the same reference numerals, and repeated explanation thereof will be omitted. The second exemplary embodiment calculates a life value for a document group which is a set of plural documents and selects a retrieval target based on the calculated life value. A document group may be used if the existence of a set of group documents has meaning as a retrieval target. For example, this may correspond to IPC, which is a technique classification in the patent publications. In more detail, a patent publication group having an IPC becomes a retrieval target, and even a patent publication which has never been selected can become a retrieval target if it belongs to an IPC of another patent publication which is being frequently selected. Conversely, a patent publication belonging to an IPC which has not been selected for a long time although it was once selected in the past does not become a retrieval target.

The document group mapping module 960 is connected to the display document selection module 130 and the document state storage module 135. The document group mapping module 960 extracts the document group to which the document selected by the display document selection module 130 belongs. Then, the document group mapping module 960 transfers the document and the extracted document group to the document state storage module 135.

Figure 10:
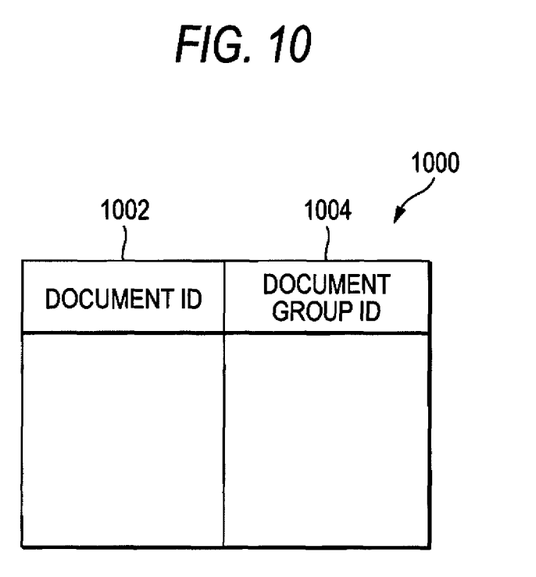
FIG. 10 is an explanatory view showing an example data structure of a document group table.

For example, the document group mapping module 960 stores a document group table 1000. FIG. 10 is an explanatory view showing an example data structure of the document group table 1000. The document group table 1000 has a document ID column 1002 and a document group ID column 1004.

The document ID column 1002 stores a document ID.

The document ID group column 1004 stores a document group ID identifying the document group corresponding to the document ID uniquely.

The document group mapping module 960 receives the document ID of the document selected from the display document selection module 130, retrieves the corresponding document ID from the document ID column 1002, extracts the document group ID corresponding to the retrieved document ID from the document group ID column 1004, and transfers the extracted document group ID to the document state storage module 135 along with the document ID.

The display document selection module 130 is connected to the document display module 125 and the document group mapping module 960. The display document selection module 130 transfers the document ID of the document selected by a user to the document group mapping module 960.

The document state storage module 135 is connected to the display object selection module 150, the document group mapping module 960 and the life calculation module 140. The document state storage module 135 receives and stores the document ID and the document group ID from the document group mapping module 960. For example, a column storing the document group ID may be additionally provided in the document state table 400 shown in the example of FIG. 4.

The life calculation module 140 calculates a life value for the document group. For example, the life calculation module 140 calculates a life value for each document group ID stored in the document group ID column added to the document state table 400. The method of calculating the life value is the same as the above-described first exemplary embodiment except that the life value is calculated for each document group, not for each document.

The document selection module 105 selects a document group to be retrieved.

Figure 11:
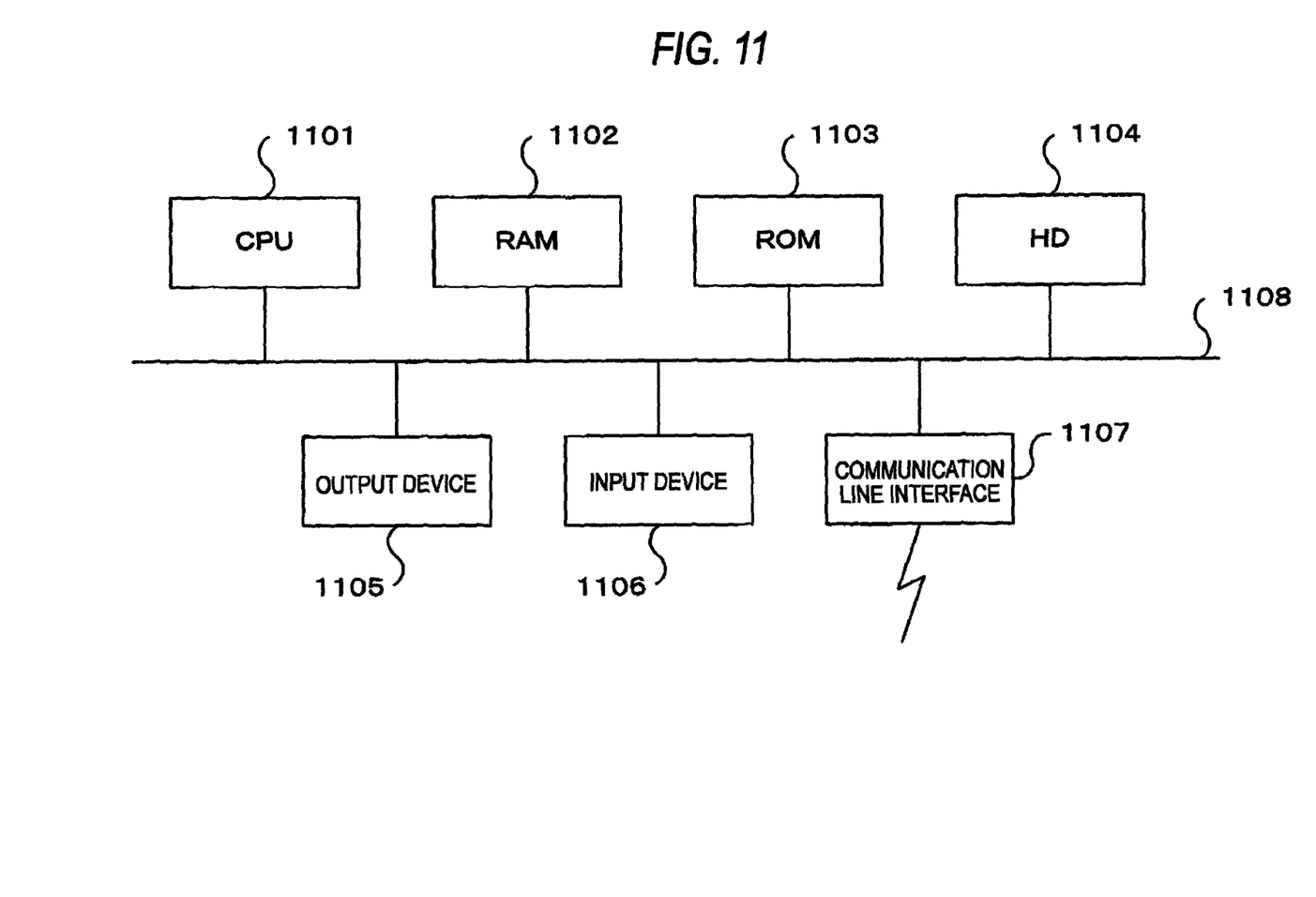
FIG. 11 is a block diagram showing an example hardware configuration of a computer for implementing the first and second exemplary embodiments.

The hardware configuration of a computer executing a program in the form of the above described embodiments is a general computer, specifically, a personal computer, a computer serving as a server, etc, as shown in FIG. 11. More specifically, CPU 1101 is used as a processor (arithmetic logic unit), and RAM 1102, ROM 1103 and HD 1104 (for example a hard disk can be used) are used as storage devices. The hardware configuration of the computer includes the CPU 1101 executing programs of the document selection module 105, the keyword retrieval module 110, the life calculation module 140, the document group mapping module 960, etc., the RAM 1102 storing the programs and data, the ROM 1103 in which a program to start the computer and so on are stored, the HD 1104 as an auxiliary storage device, input devices 1106 such as a keyboard, a mouse and the like to input data, an output device 1105 such as a CRT or a liquid crystal display device, a communication line interface 1107 (which can, for example, use a network interface card) to be connected with a communication network, and a bus 1108 to interconnect the above components for data exchange among these components. Plural computers may be interconnected via a network.

The above-described embodiments are implemented by reading the computer program as software in the system of the hardware configuration and cooperation between software and hardware resources.

The hardware configuration shown in FIG. 11 is only by way of example, and the above-described embodiments are not limited to the hardware configuration shown in FIG. 11 but may have any configuration as long as it can execute the modules described in the above-described embodiments. For example, some modules may be configured as a dedicated hardware (for example, ASIC (Application Specific Integrated Circuit) or the like), some modules may be connected via a communication line with an external system, and additionally plural systems shown in FIG. 11 may be interconnected via a communication line to allow cooperation between them. In addition, particularly, the hardware configuration may be assembled in an information home appliance, a copier, a facsimile, a scanner, a printer, a multifunction copier (image processing apparatus having two or more of the following: scanner, printer, copier and facsimile or the like) in addition to the personal computer.

Although the terms "equal to or larger than", "smaller than" and so on are used to explain the relation between a life value and a threshold value in the above-described embodiments, the terms "larger than", "equal to or smaller than" and so on may be used and any combination thereof may be used as long as it is not contradictory.

Although a life value illustrated as a retrieval target tends to decrease with time, it may increase with time. For example, a reciprocal of the life value may be used as a retrieval target. In this case, the relation with a threshold value is reversed.

The above-described program may be stored in a recording medium or may be provided by a communication device. In this case, for example, the above-described program may be understood as the invention of a "computer-readable recording medium having a program recorded therein."

"Computer-readable recording medium having a program recorded therein" refers to a computer-readable recording medium having a program recorded therein, which is used for the installation, execution, distribution and so on of the program.

The recording medium may include, for example, a digital versatile disc (DVD) such as "DVR-R, DVD-RW, DVD-RAM and the like", which are a standard specified by DVD Forum, and "DVD+R, DVD+RW and the like", which are a standard specified as DVD+RW, a compact disc (CD) such as read-only memory (CD-ROM), CD recordable (CD-R), CD rewritable (CD-RW) or the like, a blue-ray disc (trademark), a magneto-optical disc (MO), a flexible disc (FD), a magnetic tape, a hard disk, a read only memory (ROM), an electrically erasable programmable read-only memory (EEPROM), a flash memory, a random access memory (RAM), etc.

The program or a part thereof may be recorded in the recording medium for storage and distribution. In addition, the program or a part thereof may be transmitted via a communication device, for example, a transmission medium such as a wired network or a wireless network used for a local area network (LAN), metropolitan area network (MAN), wide area network (WAN), Internet, intranet, extranet and so on, or further a combination thereof, or may be carried using a carrier wave.

The program may be a part of another program or may be recorded in the recording medium along with a separate program. In addition, the program may be divided and recorded in plural recording media. In addition, the program may be recorded in any form including compression, encryption and so on as long as it can be reproduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory that stores pieces of information; and
at least one processor;
wherein the at least one processor calculates a retrieval target level for each one of the pieces of information using at least one of an output of a first function at a present time and an output of a second function at the present time,
wherein the first function includes a decreasing function depending on time,
wherein the second function includes a decreasing function depending on time,
wherein the at least one processor selects at least one of the pieces of information as a retrieval target using the retrieval target levels calculated by the at least one processor,
wherein the at least one processor retrieves the selected at least one of the pieces of information,
wherein the at least one processor calculates the retrieval target level for each one of the pieces of information using the output of the first function if:
the retrieval target level is larger than a first threshold value, or
the respective one of the pieces of information has not been accessed by a user after the retrieval target level has become equal to or smaller than the first threshold value,
wherein the at least one processor calculates the retrieval target level for each one of the pieces of information using the output of the second function if the respective one of the pieces of information is accessed by a user after the retrieval target level has become equal to or smaller than the first threshold value.

2. The information processing apparatus according to claim 1, wherein the first function and the second function depend on a time elapsed from when an object, which is a part of the respective one of the pieces of information, was selected until the present time.

3. The information processing apparatus according to claim 1, wherein the at least one processor increases the retrieval target level for each one of the pieces of information a specific amount according to a user who selected each one of the pieces of information in the past.

4. The information processing apparatus according to claim 2, wherein the at least one processor increases the retrieval target level for each one of the pieces of information a specific amount according to a user who selected the object in the past.

5. The information processing apparatus according to claim 1, wherein if the retrieval target level calculated for the selected at least one of the pieces of information is larger than a second threshold value, then the at least one processor sets an entire document as the retrieval target, and
wherein if the retrieval target level calculated for the selected at least one of the pieces of information is not larger than the second threshold value, then the at least one processor sets a previously selected subpart of the entire document as the retrieval target.

6. The information processing apparatus according to claim 5, wherein the at least one processor prohibits from being selected as the retrieval target any ones of the pieces of information for which the calculated retrieval target level is not larger than a third threshold value that is different from the second threshold value.

7. An information processing apparatus comprising:
a memory that stores pieces of information; and
at least one processor;
wherein the at least one processor calculates a retrieval target level for each one of a plurality of information groups, each one of the information groups being a set of plural pieces of information, using at least one of an output of a first function at a present time and an output of a second function at the present time,
wherein the first function includes a decreasing function depending on time, wherein the second function includes a decreasing function depending on time, wherein the at least one processor selects at least one of the information groups as a retrieval-target using the retrieval target levels calculated by the at least one processor, wherein the at least one processor selects at least one of the pieces of information of the selected at least one of the information groups, wherein at least one processor retrieves the selected at least one of the information groups, wherein the at least one processor calculates the retrieval target level for each one of the information groups using the output of the first function if:

the retrieval target level is larger than a first threshold value, or the respective one of the information groups has not been accessed by a user after the retrieval target level has become equal to or smaller than the first threshold value, wherein the at least one processor calculates the retrieval target level for each one of the information groups using the output of the second function if the respective one of the information groups is accessed by a user after the retrieval target level has become equal to or smaller than the first threshold value.

8. An information processing method comprising:

calculating a retrieval target level for each one of pieces of information using at least one of an output of a first function at a present time and an output of a second function at the present time;

wherein the first function includes a decreasing function depending on time, and wherein the second function includes a decreasing function depending on time, selecting at least one of the pieces of information as a retrieval target using the calculated retrieval target levels; and retrieving the selected at least one of the pieces of information, wherein the calculating comprises:

calculating the retrieval target level for each one of the pieces of information using the output of the first function if:

the retrieval target level is larger than a first threshold value, or the respective one of the pieces of information has not been accessed by a user after the retrieval target level has become equal to or smaller than the first threshold value; and calculating the retrieval target level for each one of the pieces of information using the output of the second function if the respective one of the pieces of information is accessed by a user after the retrieval target level has become equal to or smaller than the first threshold value.

9. A non-transitory computer-readable medium storing a program that causes a computer to execute information processing, the information processing comprising:

calculating a retrieval target level for each one of pieces of information using at least one of an output of a first function at a present time and an output of a second function at the present time;

wherein the first function includes a decreasing function depending on time, and wherein the second function includes a decreasing function depending on time, selecting at least one of the pieces of information as a retrieval target using the calculated retrieval target levels; and retrieving the selected at least one of the pieces of information, wherein the calculating comprises:

calculating the retrieval target level for each one of the pieces of information using the output of the first function if:

the retrieval target level is larger than a first threshold value, or the respective one of the pieces of information has not been accessed by a user after the retrieval target level has become equal to or smaller than the first threshold value; and calculating the retrieval target level for each one of the pieces of information using the output of the second function if the respective one of the pieces of information is accessed by a user after the retrieval target level has become equal to or smaller than the first threshold value.

10. The information processing apparatus according to claim 1, wherein the first function includes a decreasing function depending on time elapsed since each one of the pieces of information was first stored in the memory.

11. The information processing apparatus according to claim 3, wherein the at least one processor does not increase the retrieval target level for each one of the pieces of information in response to repeated selection by a same user.

\* \* \* \* \*